United States Patent
Antoniono et al.

(10) Patent No.: US 9,835,333 B2
(45) Date of Patent: Dec. 5, 2017

(54) SYSTEM AND METHOD FOR UTILIZING COOLING AIR WITHIN A COMBUSTOR

(71) Applicant: General Electric Company, Schenectady, NY (US)

(72) Inventors: Carolyn Ashley Antoniono, Greenville, SC (US); Yon Han Chong, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 335 days.

(21) Appl. No.: 14/580,315

(22) Filed: Dec. 23, 2014

(65) Prior Publication Data

US 2016/0178202 A1    Jun. 23, 2016

(51) Int. Cl.
*F23R 3/10*  (2006.01)
*F23R 3/28*  (2006.01)

(52) U.S. Cl.
CPC ............... *F23R 3/10* (2013.01); *F23R 3/286* (2013.01); *F23R 2900/03043* (2013.01); *Y02T 50/675* (2013.01)

(58) Field of Classification Search
CPC .. F02R 3/10; F23R 3/286; F23R 2900/03043; F23R 3/283; F23R 3/32; F23R 3/002; F02C 7/12; F02C 7/18; F02C 7/22; F02C 7/222
See application file for complete search history.

(56) References Cited

U.S. PATENT DOCUMENTS

| | | |
|---|---|---|
| 5,274,991 A | 1/1994 | Fitts |
| 5,357,745 A | 10/1994 | Probert |
| 5,373,695 A * | 12/1994 | Aigner ................. F23M 20/005 60/725 |
| 6,484,505 B1 | 11/2002 | Brown |
| 6,923,002 B2 | 8/2005 | Crawley et al. |
| 8,387,396 B2 | 3/2013 | Chen |
| 9,004,912 B2 * | 4/2015 | Stoia ....................... F23R 3/283 431/12 |
| 9,341,375 B2 * | 5/2016 | Kim .......................... F23R 3/10 |
| 2009/0188255 A1 | 7/2009 | Green |
| 2010/0300106 A1 | 12/2010 | Edwards et al. |

(Continued)

OTHER PUBLICATIONS

Co pending U.S. Appl. No. 14/462,639 dated Aug. 19, 2014.
Co pending U.S. Appl. No. 14/462,646 dated Aug. 19, 2014.
Co pending U.S. Appl. No. 14/462,637 dated Aug. 19, 2014.

*Primary Examiner* — Pascal M Bui Pho
*Assistant Examiner* — Edwin Kang
(74) *Attorney, Agent, or Firm* — Dority & Manning, PA

(57) ABSTRACT

A system for utilizing cooling air within a combustor includes a fuel nozzle having an axially extending center body, a burner tube that circumferentially surrounds at least a portion of the center body and a premix passage defined between the center body and the burner tube. The system further includes a combustor cap assembly having a first cooling air plenum defined between a cap plate and a first partitioning plate, a second cooling air plenum defined upstream from the first cooling air plenum between a second partitioning plate and the first partitioning plate, and a tube that provides for fluid communication from the first cooling air plenum, through the second cooling air plenum and through the second partitioning plate. The system provides a method for utilizing the cooling air within the combustor.

20 Claims, 6 Drawing Sheets

(56) References Cited

U.S. PATENT DOCUMENTS

| | | |
|---|---|---|
| 2011/0197586 A1 | 8/2011 | Berry |
| 2012/0055163 A1 | 3/2012 | Uhm |
| 2012/0060511 A1 | 3/2012 | Zuo |
| 2012/0180490 A1* | 7/2012 | Takami ............... F23R 3/14 60/740 |
| 2013/0019602 A1* | 1/2013 | Kim .................... F23R 3/10 60/725 |
| 2013/0074503 A1 | 3/2013 | Rohrssen |
| 2013/0074510 A1* | 3/2013 | Berry .................. F23R 3/36 60/772 |
| 2013/0086912 A1 | 4/2013 | Berry |
| 2013/0122435 A1* | 5/2013 | Stoia .................. F23R 3/283 431/12 |

* cited by examiner

SYSTEM AND METHOD FOR UTILIZING COOLING AIR WITHIN A COMBUSTOR

FIELD OF THE INVENTION

The present invention generally relates to a combustor for a gas turbine. More particularly, this invention involves a system and method for utilizing cooling air within the combustor.

BACKGROUND OF THE INVENTION

In an air-ingesting turbomachine (e.g., a gas turbine), air enters a compressor and is progressively pressurized as it is routed towards a combustor. The compressed air is premixed with a fuel and ignited within a reaction zone defined within the combustor, thus producing high temperature combustion gases. The combustion gases are then routed from the combustion chamber via a liner and/or a transition piece into a turbine section of the turbomachine where the combustion gases flow across alternating rows of stationary vanes and rotor blades which are secured to a rotor shaft. As the combustion gases flow across the rotor blades, kinetic and/or thermal energy are transferred to the rotor blades, thus causing the rotor shaft to rotate.

To increase turbine efficiency, modern combustors are operated at high temperatures which generate high thermal stresses on various mechanical components disposed within the combustor. As a result, at least a portion of the compressed air supplied to the combustor is used as cooling air to cool these components. For example, particular combustors include a generally annular combustor cap assembly that at least partially surrounds one or more fuel nozzles within the combustor. Certain combustor cap assembly designs include a cap plate that is disposed at a downstream end of the combustor cap assembly. The fuel nozzles extend at least partially through the cap plate which is typically disposed substantially adjacent to the combustion chamber. As a result, the cap plate is generally exposed to extremely high temperatures.

One way to cool the cap plate is to route a portion of the compressed air as cooling air into the combustor cap assembly and onto an upstream side of the cap plate. The cooling air is then routed through multiple cooling or effusion holes which extend through the cap plate. The cooling air flows from the effusion holes into the reaction zone defined within the combustor. This method is known in the industry as effusion cooling. However, the cooling air flowing through the multiple cooling holes enters the reaction zone unmixed with the fuel and at a temperature which is much lower than the combustion flame temperature. As a result, NOx and/or $CO_2$ generation may be exacerbated and overall turbine efficiency may be decreased. In addition, the cooling capacity of the cooling air is not fully optimized, thus reducing the cooling efficiency of the combustor. Therefore, an improved system and method for utilizing cooling air within the combustor cap assembly would be useful.

BRIEF DESCRIPTION OF THE INVENTION

Aspects and advantages of the invention are set forth below in the following description, or may be obvious from the description, or may be learned through practice of the invention.

One embodiment of the present invention is a system for utilizing cooling air within a combustor. The system includes a fuel nozzle having an axially extending center body, a burner tube that circumferentially surrounds at least a portion of the center body and a premix passage defined between the center body and the burner tube. The system further includes a combustor cap assembly having a first cooling air plenum defined between a cap plate and a first partitioning plate, a second cooling air plenum defined upstream from the first cooling air plenum between a second partitioning plate and the first partitioning plate, and a tube that provides for fluid communication from the first cooling air plenum, through the second cooling air plenum and through the second partitioning plate. The fuel nozzle extends axially within the combustor cap assembly.

Another embodiment of the present invention is a combustor. The combustor includes an end cover that is coupled to an outer casing. The end cover and the outer casing define a high pressure plenum and a head end of the combustor. The combustor further includes a fuel nozzle that extends axially downstream from the end cover and that is in fluid communication with the head end. The fuel nozzle includes an axially extending center body, a burner tube that circumferentially surrounds at least a portion of the center body, a premix passage defined between the center body and the burner tube and a purge air passage defined within the center body. The combustor further includes a combustor cap assembly that circumferentially surrounds at least a portion of the fuel nozzle. The combustor cap assembly includes a first cooling air plenum that is defined between a cap plate and a first partitioning plate, a second cooling air plenum that is defined upstream from the first cooling air plenum between a second partitioning plate and the first partitioning plate, and a tube. The tube provides for fluid communication from and/or out of the first cooling air plenum, through the second cooling air plenum and through the second partitioning plate.

Another embodiment of the present invention is a method for utilizing cooling air within a combustor such as a gas turbine combustor. The method includes flowing cooling air from an annular flow passage defined within the combustor into a second cooling air plenum of a combustor cap assembly. The annular flow passage is in fluid communication with a high pressure plenum. The method further includes flowing the cooling air through a first partitioning plate and into a first cooling air plenum of the combustor cap assembly such that the cooling air flows against a cold side of a cap plate of the combustor cap assembly to provide cooling thereto. The method further includes routing exhaust cooling air out of the first cooling air plenum to a head end portion of the combustor via a tube. The tube extends from an opening defined in the first partitioning plate, through the second cooling air plenum and through a second partitioning plate that at least partially defines the second cooling air plenum.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
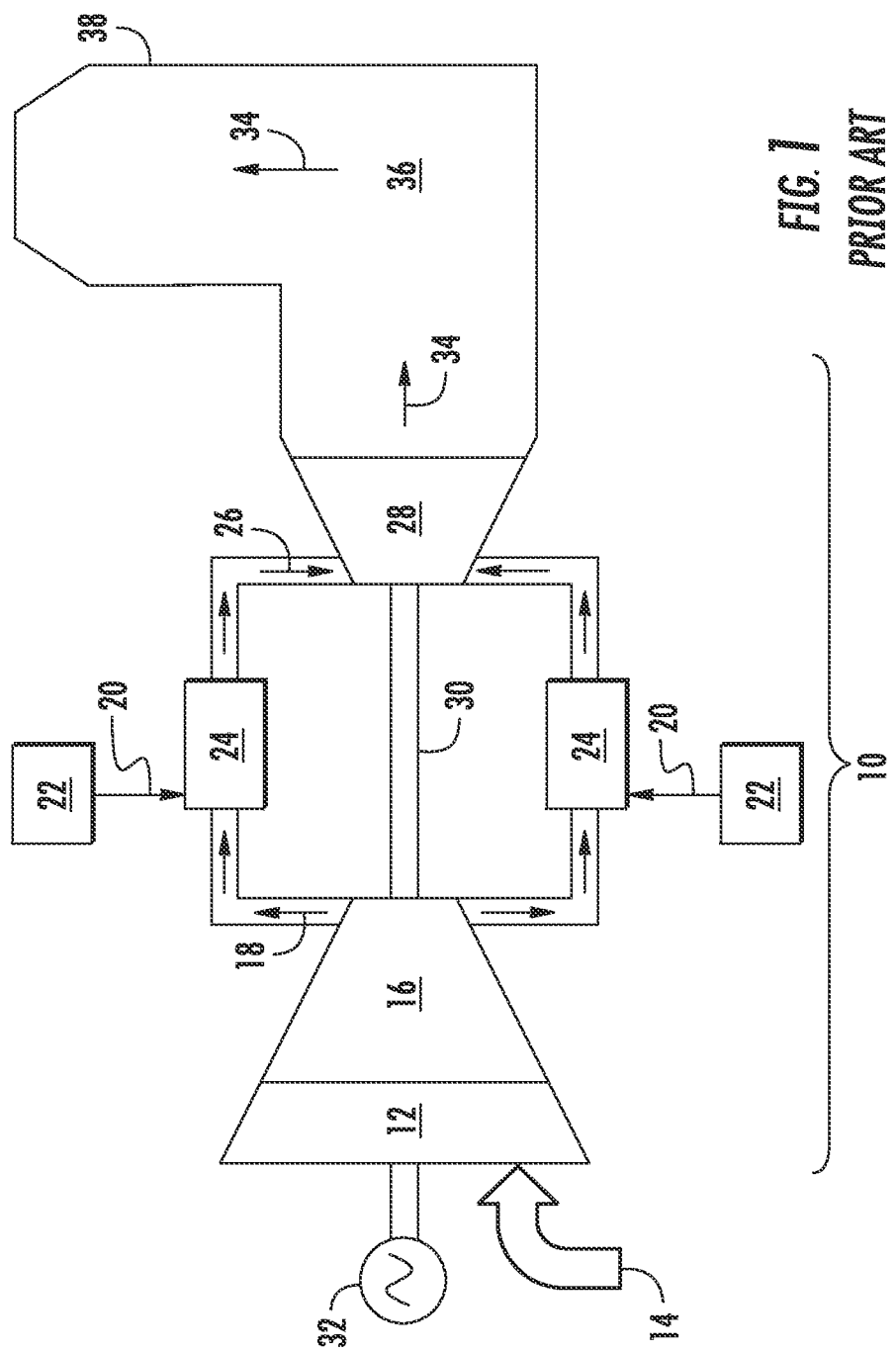
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to and/or at angle with an axial centerline of a particular component, and the term "axially" refers to the relative direction that is substantially parallel and/or coaxially aligned with an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although a combustor for an industrial or land based gas turbine is shown and described herein, the present invention is not limited to a combustor for a land based and/or industrial gas turbine unless otherwise specified in the claims. For example, the invention as described herein may be used in a combustor for an aircraft gas turbine or marine gas turbine.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce compressed or pressurized air 18.

The compressed air 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
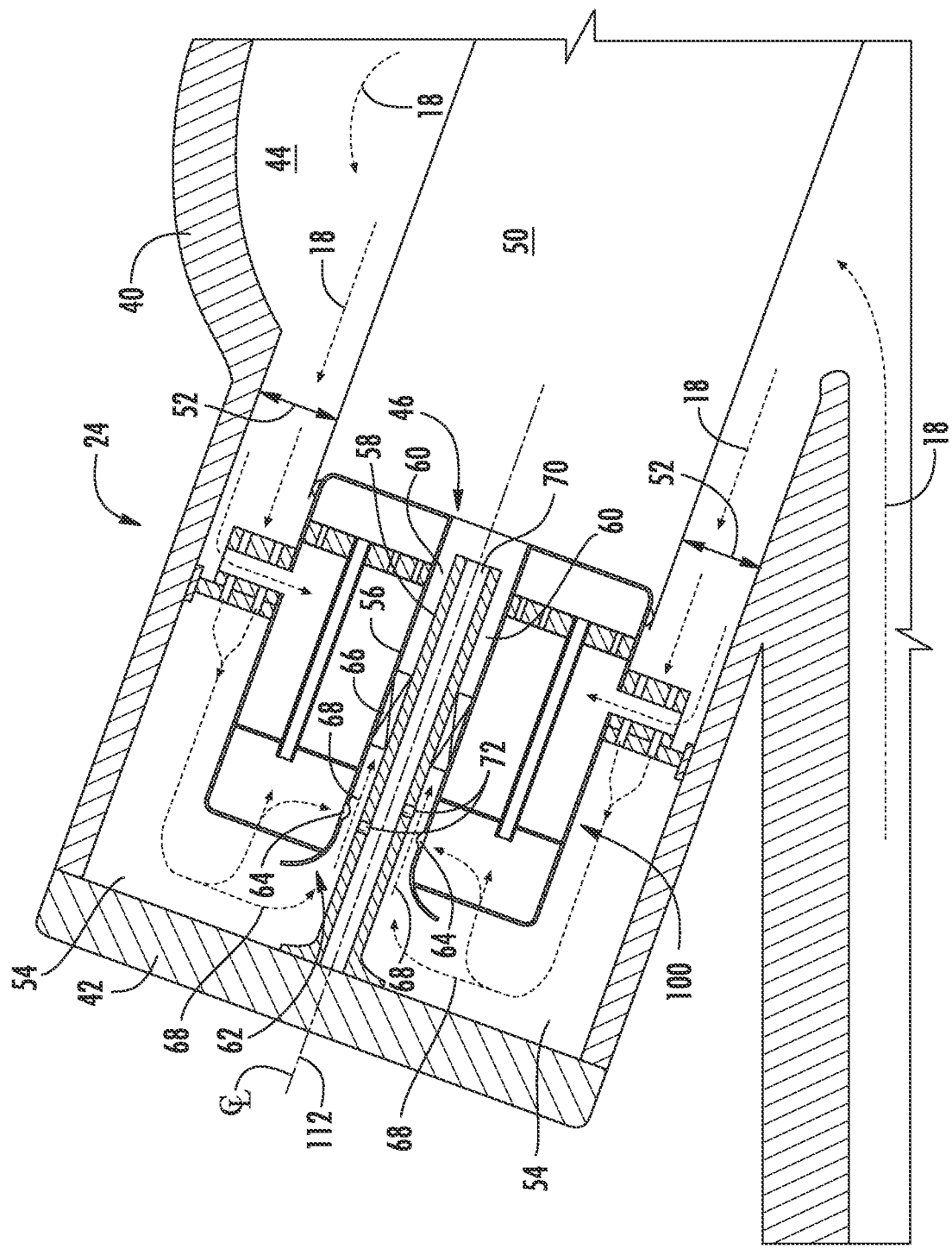
FIG. 2 is a cross sectional side view of a portion of an exemplary combustion section of a gas turbine including an exemplary combustor, according to one or more embodiments of the present invention.

FIG. 2 is a cross sectional side view of a portion of an exemplary combustor 24 according to one or more embodiments of the present invention. As shown in FIG. 2, the combustor 24 is at least partially surrounded by at least one outer casing 40 such as a compressor discharge casing. The outer casing 40 is in fluid communication with the compressor 16 (FIG. 1) so as to receive at least a portion of the compressed air 18 therefrom. In one configuration, as shown in FIG. 2, an end cover 42 is coupled to the outer casing 40. The outer casing 40 and/or the end cover 42 at least partially define a high pressure plenum 44 which at least partially surrounds the combustor 24.

At least one fuel nozzle 46 extends axially within the outer casing 40 with respect to an axial centerline of the combustor 24. In particular configurations, the combustor 24 may include a plurality of fuel nozzles 46 extending axially within the outer casing 40. The fuel nozzle 46 may be coupled at a first end to the end cover 42. One or more liners 48 such as a combustion liner or transition duct extend downstream from the fuel nozzle 46 and may at least partially define a combustion reaction zone or chamber 50 within the outer casing 40. In addition, the liner 48 may at least partially define an annular flow passage 52 within the outer casing 40. In particular embodiments, the annular flow passage 52 may be further defined by the outer casing 40, the end cover 42 and/or other liners or features defined within the outer casing 40. The annular flow passage 52 defines a fluid flow path for routing at least a portion of the compressed air 18 from the high pressure plenum 44 and/or the compressor 16 (FIG. 1) towards a head end portion 54 of the end cover 42.

In particular embodiments, the fuel nozzle 46 includes an outer sleeve or burner tube 56. The burner tube 56 circumferentially surrounds at least a portion of a center body or nozzle 58 so as to at least partially define an annular or premix passage 60 therebetween. The burner tube 56 includes an inlet 62 to the premix passage 60 that is defined proximate to the end cover 40 and that is in fluid communication with the head end 54. The premix passage 60 is in fluid communication with the head end 54. In particular embodiments, the burner tube 56 includes and/or defines at least one radial opening 64. The radial opening 64 provides for fluid communication through the burner tube 56 and into the annular flow passage 60 defined between the center body 58 and the burner tube 56.

In particular configurations, the fuel nozzle 46 includes a plurality of swirler or turning vanes 66 that extend radially outwardly from the center body 58 towards the burner tube 56 within the premix passage 60. Each or some of the swirler vanes 66 may include one or more fuel injection ports (not shown). In operation, the swirler vanes 66 impart angular swirl to a premix or combustion portion 68 of the compressed air 18 as it passes across the swirler vanes 66 and through the annular flow passage 60 to enhance premixing of fuel and the premix portion 68 of the compressed air 18 upstream from the combustion zone 50. The radial opening 64 may be positioned at any axial position along the burner tube 56. For example, the radial opening 64 may be defined upstream, at or downstream from the swirler vanes 66.

In particular configurations, the center body 58 at least partially defines a purge or pilot air passage 70 for routing compressed air through the center body 58 for purge, cooling and/or or piloted combustion operation. In one embodiment, the center body 58 includes at least one orifice 72. The orifice(s) 72 provides for fluid communication through the center body 58 into the purge or pilot air passage 70. In one embodiment, the orifice(s) 72 provides for fluid communication between at least one of the premix passage 60 or the head end 54 and the purge or pilot air passage 70.

Figure 3:
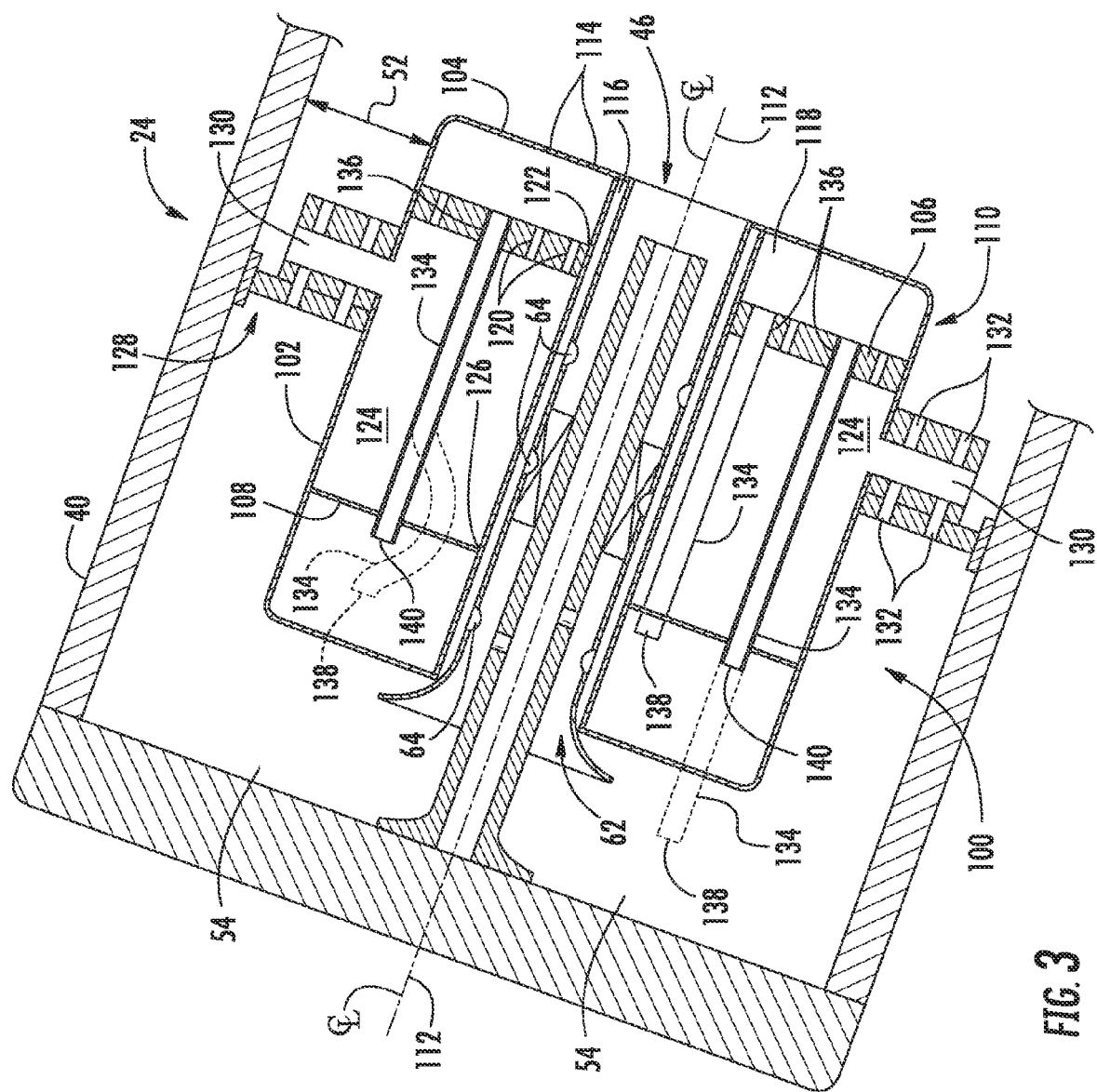
FIG. 3 is an enlarged cross sectional perspective view of a portion of the combustor as shown in FIG. 2, according to one or more embodiments of the present invention.

In various embodiments, at least a portion of the fuel nozzle(s) 46 extends axially through a combustor cap assembly 100. The fuel nozzle(s) 46 and the combustor cap assembly 100 may be provided individually or as a system for utilizing cooling and/or compressed air within the combustor 24. FIG. 3 is an enlarged cross sectional side view of the combustor 24 shown in FIG. 2, according to one or more embodiments of the present invention. As shown in FIG. 3, the combustor cap assembly 100 extends radially, circumferentially and axially within the outer casing 40. The combustor cap assembly 100 includes at least one annularly shaped shroud 102 which circumferentially surrounds at least a portion of the fuel nozzle 46. The shroud 102 may comprise a single or unitary shroud or may include multiple shrouds coupled together at or proximate to their respective ends via bolts, welding or any other suitable mechanical fastening means so as to define a singular annular shaped shroud. In particular embodiments, the shroud 102 at least partially defines the annular flow passage 52 within the outer casing 40.

In particular embodiments, the combustor cap assembly 100 includes an effusion or cap plate 104, a first partitioning plate 106 and a second partitioning plate 108. The cap plate 104 extends axially, radially and circumferentially across an aft end 110 of the combustor cap assembly 100 with respect to an axial centerline 112 of the combustor cap assembly 100. In particular embodiments, the cap plate 104 is generally solid or continuous. In particular embodiments, the cap plate 104 may include a plurality of cooling/effusion holes or passages 114. In particular embodiments, the cap plate 104 may at least partially define one or more fuel nozzle passages 116 defined therein for receiving the fuel nozzle(s) 46.

In particular embodiments, the first partitioning plate 106 extends axially, radially and circumferentially within the shroud 102 with respect to centerline 112 from the cap plate 104. The first partitioning plate 106 is axially spaced from the cap plate 104 and extends substantially parallel to the cap plate 104. The first partitioning plate 106 and the cap plate 104 at least partially define a first cooling air plenum 118 therebetween.

In one embodiment, the first partitioning plate 106 may include and/or define a plurality of impingement holes 120 that provided for fluid communication through the first partitioning plate 106 and into the first cooling air plenum 118. In various embodiments, the first partitioning plate 106 at least partially defines one or more fuel nozzle passage(s) 122 for receiving the fuel nozzle(s) 46. In particular embodiments, the fuel nozzle passage(s) 122 is/are concentrically aligned with the fuel nozzle passage(s) 116 of the cap plate 104.

In particular embodiments, the second partitioning plate 108 extends axially, radially and circumferentially within the shroud 102 with respect to centerline 112 upstream from the first partitioning plate 106. The second partitioning plate 108 is axially spaced from the first partitioning plate proximate to the inlet 62 of the burner tube 56. In particular embodiments, the second partitioning plate 108 is substantially parallel to the first partitioning plate 106. The second partitioning plate 108 and the first partitioning plate 106 at least partially define a second cooling air plenum 124 therebetween. In various embodiments, the second partitioning plate 108 at least partially defines one or more fuel nozzle passage(s) 126 for receiving the fuel nozzle(s) 46. In particular embodiments, the fuel nozzle passage(s) 126 is/are concentrically aligned with the fuel nozzle passage(s) 116 of the cap plate 104 and/or the fuel nozzle passage(s) 122 of the first partitioning plate 106.

Figure 4:
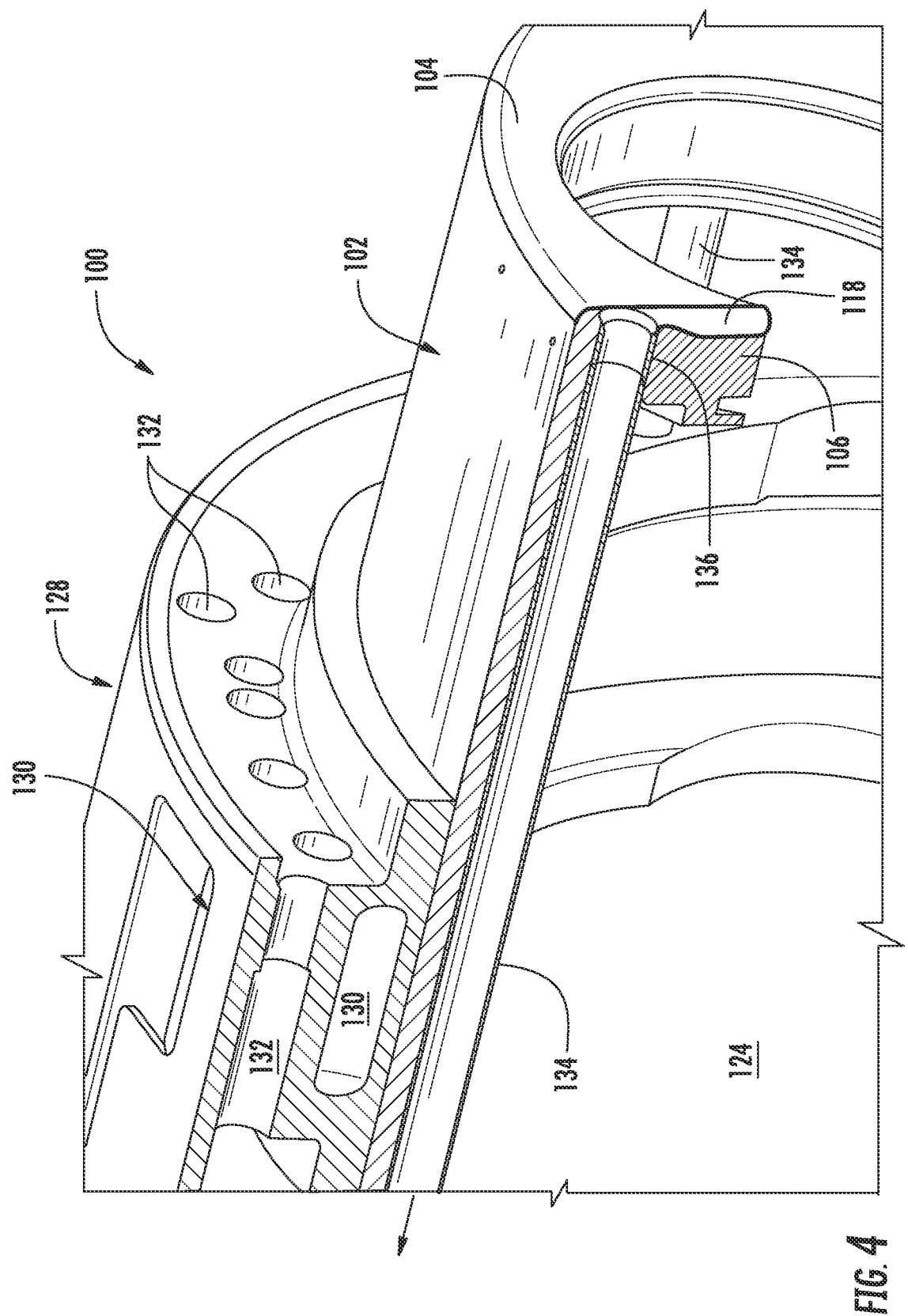
FIG. 4 is a perspective view of a portion of an exemplary combustor cap assembly of the combustor as shown in FIG. 3, according to one embodiment of the present invention.

In particular configurations, the combustor cap assembly 100 includes an outer support sleeve 128. FIG. 4 provides a cross sectioned perspective view of a portion of the combustor cap assembly 100 including a portion of the shroud 102, the cap plate 104, the first partitioning plate 106 and the outer support sleeve 128 according to one or more embodiments of the present invention. As shown in FIGS. 3 and 4, the outer support sleeve 128 extends axially, radially and circumferentially from the shroud 102 towards the outer casing 40 (FIG. 3) within the annular flow passage 52 (FIG. 3).

In one embodiment, as shown in FIG. 3, the outer support sleeve 128 couples the combustor cap assembly 100 to the outer casing 40. In one embodiment, as shown in FIGS. 3 and 4, the outer support sleeve 128 at least partially defines one or more passages 130. The passage(s) 130 provides a flow path for fluid communication between the high pressure plenum 44 (FIG. 2) and the second cooling air plenum 124. As shown in FIGS. 3 and 4, the passage(s) 130 may extend generally or substantially radially through the outer support sleeve 128 with respect to centerline 112. In particular embodiments, the outer support sleeve 128 may define a plurality of axially extending thru-holes 132. The thru-holes 132 may provide for flow conditioning of a portion of the compressed air 18 as it flows through the annular flow passage 52 towards the head end 54. For example, the thru-holes 132 may reduce pressure or flow velocity at the head end 54.

In various embodiments, as shown in FIGS. 3 and 4 collectively, the combustor cap assembly 100 includes a plurality of tubes 134. Each tube 134 extends from a corresponding opening 136 defined within and/or by the first partitioning plate 106, through the second cooling air plenum 124 and towards the head end 54 (FIG. 3) of the combustor 24. In particular embodiments, as shown in FIG. 3, the tubes 134 extend through the second partitioning plate 108 towards the head end 54. Each tube 134 includes an exhaust or outlet 138.

The tubes 134 provide for fluid communication from the first cooling air plenum 118, through the second cooling air plenum 124 and to or at least towards the head end 54 of the combustor 24. The tubes 134 may generally isolate flow of a cooling medium such as compressed air from the cooling plenum 124. The tubes 134 may extend generally axially with respect to centerline 112. In other embodiments, as illustrated via dashed lines in FIG. 3, the tubes 134 may be curved or otherwise non-straight so as to define a tortuous flow path through the second cooling air plenum 124. Each tube 134 includes an outlet In particular embodiments, as shown in FIG. 3 via dashed lines, the outlet 138 of at least one of the tubes 134 is disposed upstream and/or proximate to the inlet 62 to the annular flow passage 60 of the burner tube 56. In particular embodiments, as shown in FIG. 3, the outlet 138 of at least one of the tubes 134 is disposed upstream and/or proximate to the radial opening 64 defined in the burner tube 56. In particular embodiments, as shown in FIG. 3, the outlet 138 of at least one of the tubes 134 is disposed upstream and/or proximate to the orifice(s) of the center body 58.

Figure 5:
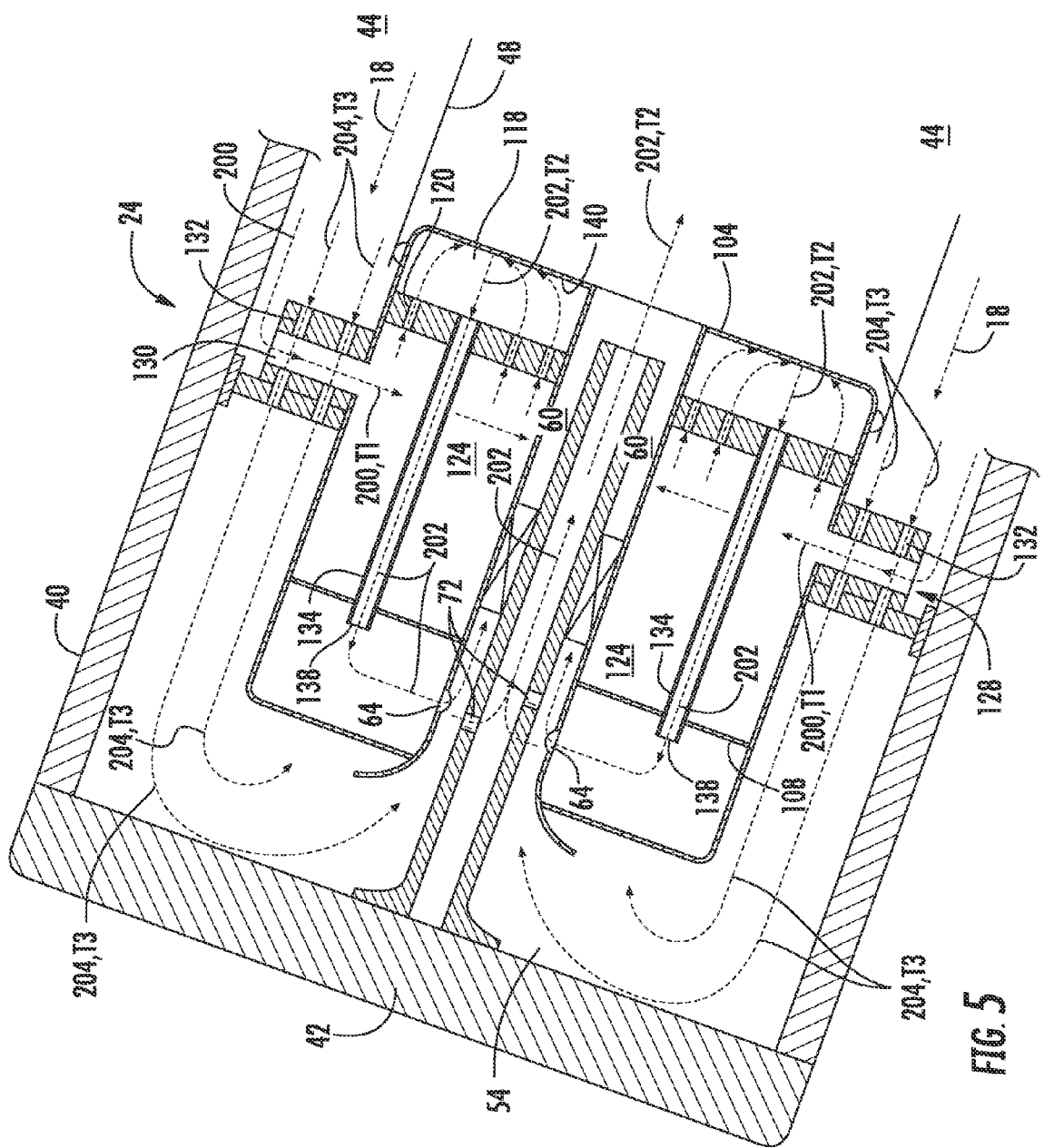
FIG. 5 is an enlarged cross sectional perspective view of a portion of the combustor as shown in FIG. 2 that provides an operational flow diagram of the combustor as shown in FIG. 2, according to one or more embodiments of the present invention.

FIG. 5 is an enlarged cross sectional side view of the combustor 24 and provides a flow diagram of a portion of the combustor 24 in operation, as described herein and shown in FIGS. 2, 3 and 4, according to one or more embodiments of the present invention. In operation, a portion of the compressed air 18 from the high pressure plenum 44 is routed into the second cooling air plenum 124 as cooling air 200 at a first temperature ($T_1$). $T_1$ may be substantially equal to the temperature of the compressed air 18 within the high pressure plenum 44. In particular embodiments, the cooling air 200 is routed into the second cooling air plenum 124 via the passage(s) 130.

The cooling air 200 flows through the impingement holes 120 and into the first cooling air plenum 118. The impingement holes 120 may be configured or formed to direct a jet or column of the cooling air 200 against a forward or cold side surface 140 of the cap plate 104, thus providing at least one of impingement/jet cooling or convective cooling to the cap plate 104. Thermal energy extracted from the cap plate 104 raises the temperature of the cooling air 200 within the first cooling air plenum to a second temperature ($T_2$).

Exhaust cooling air 202 flows out of the first cooling air plenum 118 at $T_2$ via the tubes 134. The tubes 134 route the exhaust cooling air 202 through the second cooling air plenum 124 and through the second partitioning plate 108. In particular embodiments, the tubes 134 fluidly isolate the exhaust cooling air 202 in the tubes from fresh cooling air 200 flowing from the high pressure plenum 44 into the second cooling air plenum 124. The exhaust cooling air 202 exits each respective tube 134 outlet 138 at a location that is between the second partitioning plate 108 and the end cover 42 outside of the second cooling air plenum 124, for example, at or proximate to the head end 54 of the combustor 24.

In one embodiment, at least portion of the exhaust cooling air 202 flows through the radial opening(s) 64 defined within the burner tube 56 and enters the premix passage 60 of the fuel nozzle 46. The exhaust cooling air 202 may enter the premix passage 60 at any point along the burner tube 56 such as upstream, at or downstream from the swirler vanes 66 depending on the axial location of the radial passage 66. In this manner, the exhaust cooling air 202 may be used to purge the premix passage 60. In addition or in the alternative, the exhaust cooling air 202 at $T_2$ which is warmer than a primary portion 204 of the compressed air 18 which flows from the high pressure plenum 44 to the head end at a third temperature ($T_3$), may be used to enhance fuel-air premixing in premix passage 60, thus increasing overall combustor efficiency.

In one embodiment, the primary portion 204 of the compressed air 18 flows through the thru-holes 132 of the outer support sleeve 128 upstream from the head end 54, thus conditioning or modifying the flow velocity or other flow properties of the primary portion 204 of the compressed air 18 as it flows towards the head end 54. At least a portion of the primary portion 204 of the compressed air 18 may mix with the exhaust cooling air 202 proximate to and/or at the head end 54 of the combustor 24.

In one embodiment, at least a portion of the exhaust cooling air 202 flows into the purge or pilot air passage 70 via the orifice(s) 72 defined in the center body 58. In this manner, the exhaust cooling air 202 may be used to purge the center body 58 and/or may be used for piloted operation of the combustor.

The reintroduction of the exhaust cooling air 202 into the premix passage 60 and/or the purge or pilot air passage 70 increases the amount of compressed air available for combustion, cooling and/or purging. As a result more of the compressed air 18 from the high pressure plenum may be used to cool the liner(s) 48 and/or other hardware within the combustors 24 and/or the turbine 28. In addition, reusing the exhaust cooling air 202 to purge the purge or pilot air passage 70 may result in a reduction of engine emissions due to the fact that the exhaust cooling air is provided at $T_2$ which is warmer than $T_1$ and $T_3$.

Figure 6:
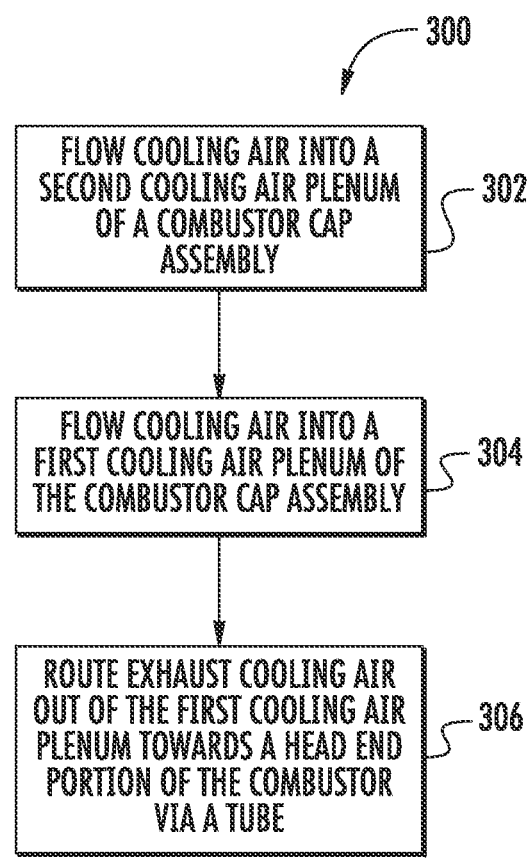
FIG. 6 is a flow diagram of an exemplary method for utilizing cooling air within the combustor as shown in FIG. 2, according to one or more embodiments of the present invention.

The various embodiments as described herein and as shown in FIGS. 2 through 5, provides a method 300 for utilizing the cooling air 200 within the combustor 24. FIG. 6 provides a flow diagram of the method 300 according to one embodiment. At 302, method 300 includes flowing the cooling air 200 from the annular flow passage 52 defined within the combustor 24 into the second cooling air plenum 124 where the annular flow passage 52 is in fluid communication with the high pressure plenum 44. At 304, method 300 includes flowing the cooling air 200 through the first partitioning plate 106 and into the first cooling air plenum 118 such that the cooling air 200 impinges against the cold side 140 of the cap plate 104 of the combustor cap assembly 100 to provide cooling thereto. At 306, method 300 includes routing exhaust cooling air 202 out of the first cooling air plenum 118 to the head end portion 54 of the combustor 24 via tube 134. The tube 134 extends from an opening 136 defined in the first partitioning plate 106, through the second cooling air plenum 124 and through the second partitioning plate 108 where the second partitioning plate 108 at least partially defines the second cooling air plenum 124.

In further embodiments, method 300 includes flowing the exhaust cooling air 202 into the purge air passage 70 defined in the center body 58 of the fuel nozzle 46. In one embodiment, method 300 further includes flowing the exhaust cooling air 202 into the premix passage 60 of the fuel nozzle 46. In one embodiment, method 300 includes flowing the compressed air 18 from the high pressure plenum 44 into the head end 54 via the annular flow passage 52 and mixing the cooling exhaust air 202 with the compressed air 18. In one embodiment, method 300 includes fluidly isolating the exhaust cooling air 202 from the cooling air 200 flowing into the second cooling air plenum 124 via the tube 134. In other embodiments, method 300 may include flowing the exhaust cooling air 202 into the premix passage 60 upstream, at or downstream from the swirler vanes 66.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for utilizing cooling air within a combustor, the system comprising:
   a fuel nozzle having an axially extending center body, a burner tube that circumferentially surrounds at least a portion of the axially extending center body and a premix passage defined between the axially extending center body and the burner tube; and
   a combustor cap assembly having a first cooling air plenum defined between a cap plate and a first partitioning plate, a second cooling air plenum defined forward from the first cooling air plenum between a shroud, a second partitioning plate, and the first partitioning plate, and a tube at least partially positioned within the second cooling air plenum, the tube providing fluid communication from the first cooling air plenum, through the second cooling air plenum and through the second partitioning plate, wherein the fuel nozzle extends axially within the combustor cap assembly.

2. The system as in claim 1, wherein the tube provides for fluid communication between the first cooling air plenum and the premix passage.

3. The system as in claim 1, wherein the fuel nozzle includes a purge air passage that extends axially within the axially extending center body, wherein the tube provides for fluid communication between the first cooling air plenum and the purge air passage.

4. The system as in claim 1, wherein the tube extends through the second cooling air plenum substantially parallel to the fuel nozzle.

5. The system as in claim 1, wherein at least a portion of the tube within the second cooling air plenum is curved.

6. The system as in claim 1, wherein the tube fluidly isolates an exhaust cooling air from the first cooling air plenum from the second cooling air plenum.

7. The system as in claim 1, wherein the combustor cap assembly further includes an outer support sleeve that extends radially outwardly from the shroud of the combustor cap assembly, wherein the outer support sleeve includes a plurality of axially extending thru-holes configured to condition compressed air flowing therethrough and towards a head end portion of the combustor.

8. A combustor, comprising:
   an end cover coupled to an outer casing, wherein the end cover and the outer casing define a high pressure plenum and a head end of the combustor;
   a fuel nozzle that extends axially downstream from the end cover and that is in fluid communication with the head end, wherein the fuel nozzle includes an axially extending center body, a burner tube that circumferentially surrounds at least a portion of the axially extending center body, a premix passage defined between the axially extending center body and the burner tube and a purge air passage defined within the axially extending center body;
   a combustor cap assembly that circumferentially surrounds at least a portion of the fuel nozzle, the combustor cap assembly comprises a first cooling air plenum defined between a cap plate and a first partitioning plate, a second cooling air plenum defined forward from the first cooling air plenum between a shroud, a second partitioning plate, and the first partitioning plate and a tube at least partially positioned within the second cooling air plenum, the tube providing fluid communication from the first cooling air plenum, through the second cooling air plenum and through the second partitioning plate, wherein the fuel nozzle extends through the combustor cap assembly.

9. The combustor as in claim 8, wherein the tube provides for fluid communication between the first cooling air plenum and the premix passage.

10. The combustor as in claim 8, wherein the tube provides for fluid communication between the first cooling air plenum and the purge air passage.

11. The combustor as in claim 8, wherein the tube extends through the second cooling air plenum substantially parallel to the fuel nozzle.

12. The combustor as in claim 8, wherein at least a portion of the tube within the second cooling air plenum is curved.

13. The combustor as in claim 8, wherein an outlet of the tube is defined proximate to at least one of a radial opening of the burner tube, an inlet to the premix passage and an orifice defined within the axially extending center body.

14. The combustor as in claim 8, wherein the second cooling air plenum is in fluid communication with the pressure plenum, wherein the tube fluidly isolates an exhaust cooling air from the first cooling air plenum from cooling air in the second cooling air plenum.

15. The combustor as in claim 8, wherein the combustor cap assembly further includes an outer support sleeve that extends radially outwardly from the shroud of the combustor cap assembly towards the outer casing, wherein the outer support sleeve includes a plurality of axially extending thru-holes.

16. A method for utilizing cooling air within a combustor, comprising:
   flowing cooling air from an annular flow passage defined within the combustor into a second cooling air plenum of a combustor cap assembly, the second cooling air plenum being defined forward from a first cooling air plenum between a shroud, a first partitioning plate, and a second partitioning plate, wherein the annular flow passage is in fluid communication with a pressure plenum;
   flowing the cooling air from the second cooling air plenum through the first partitioning plate and into the first cooling air plenum of the combustor cap assembly, wherein the cooling air flows against a cold side of a cap plate of the combustor cap assembly to provide cooling thereto;
   routing exhaust cooling air out of the first cooling air plenum to a head end portion of the combustor via a tube, wherein the tube is at least partially positioned within the second cooling air plenum and extends from an opening defined in the first partitioning plate, through the second cooling air plenum and through the second partitioning plate.

17. The method as in claim 16, further comprising flowing the exhaust cooling air into a purge air passage defined in a center body of a fuel nozzle that extends axially through the combustor cap assembly.

18. The method as in claim 16, further comprising flowing the exhaust cooling air into a premix passage defined by a fuel nozzle that extends axially through the combustor cap assembly.

19. The method as in claim 16, further comprising flowing compressed air into the head end via the annular flow passage and mixing the exhaust cooling air with the compressed air.

20. The method as in claim 16, further comprising fluidly isolating the exhaust cooling air from the cooling air within the second cooling air plenum via the tube.

\* \* \* \* \*

UNITED STATES PATENT AND TRADEMARK OFFICE
CERTIFICATE OF CORRECTION

PATENT NO. : 9,835,333 B2
APPLICATION NO. : 14/580315
DATED : December 5, 2017
INVENTOR(S) : Carolyn Ashley Antoniono and Yon Han Chong It is certified that error appears in the above-identified patent and that said Letters Patent is hereby corrected as shown below:

In the Claims

Column 9, Claim 8, Line 57 reads "cover and the outer casing define a high pressure" should read --cover and the outer casing define a pressure--

Signed and Sealed this
First Day of May, 2018

Andrei Iancu
*Director of the United States Patent and Trademark Office*